US011904625B1

(12) United States Patent
Ellis, II

(10) Patent No.: US 11,904,625 B1
(45) Date of Patent: Feb. 20, 2024

(54) AUTOMATICALLY RETRACTABLE WRITING INSTRUMENT

(71) Applicant: Paul David Ellis, II, Valley Village, CA (US)

(72) Inventor: Paul David Ellis, II, Valley Village, CA (US)

( * ) Notice: Subject to any disclaimer, the term of this patent is extended or adjusted under 35 U.S.C. 154(b) by 141 days.

(21) Appl. No.: 17/662,949

(22) Filed: May 11, 2022

(51) Int. Cl.
*B43K 24/08* (2006.01)
*B43K 24/04* (2006.01)
*B43K 24/02* (2006.01)

(52) U.S. Cl.
CPC .......... *B43K 24/082* (2013.01); *B43K 24/023* (2013.01); *B43K 24/04* (2013.01); *B43K 24/088* (2013.01)

(58) Field of Classification Search
CPC .... B43K 24/082; B43K 24/088; B43K 24/08; B43K 24/04; B43K 24/023; B43K 5/165; B43K 23/008; B43K 23/12
See application file for complete search history.

(56) References Cited

U.S. PATENT DOCUMENTS 2,802,447 A * 8/1957 Germann ............ B43K 24/088 401/112
3,181,507 A 5/1965 Dannebaum
4,358,210 A 11/1982 Hashimoto et al.
4,966,483 A 10/1990 Hashimoto et al.
6,273,627 B1 * 8/2001 Mittersinker .......... B43K 24/08 401/109
6,817,800 B2 11/2004 Sung
6,921,225 B1 * 7/2005 Hsu ...................... B43K 23/008 401/105
7,226,229 B1 6/2007 Register
10,406,849 B1 * 9/2019 Al-Khulaifi ............ G09B 11/00
2004/0136772 A1 * 7/2004 Sung .................... B43K 24/082 401/92
2005/0169692 A1 * 8/2005 Demetz .................. B43K 7/005 401/209
2006/0062628 A1 * 3/2006 Kostecki ............. B43K 23/008 401/6
2006/0216103 A1 * 9/2006 Bielecki ................ B43K 29/02 401/107
2007/0172300 A1 7/2007 Wlodarczyk
2007/0243007 A1 10/2007 Chang et al.
2009/0232581 A1 9/2009 Tong
2015/0317000 A1 * 11/2015 Liu ..................... G06F 3/03545 345/179

FOREIGN PATENT DOCUMENTS

DE 10 2006 006456 A1 8/2007

* cited by examiner

*Primary Examiner* — J C Jacyna
(74) *Attorney, Agent, or Firm* — Knobbe, Martens, Olson & Bear, LLP

(57) ABSTRACT

A writing instrument has a nib that can retract automatically upon release of a grip on the writing instrument. The writing instrument has one or more leaves that can be flexed to push the cartridge towards the front end of the writing instrument to expose the nib. A spring applies a force on the cartridge to automatically retract the nib when a grip on the writing instrument is released.

21 Claims, 12 Drawing Sheets

AUTOMATICALLY RETRACTABLE WRITING INSTRUMENT

BACKGROUND

Field

The invention generally pertains to a writing or drawing instrument, and more particularly to a writing or drawing instrument with an automatically retractable tip.

Description of the Related Art

Most writing or drawing instruments have nibs that protrude out of the bodies and remain in a protruding state unless users perform some action to retract or close the nibs (e.g., with a cap). This can often cause ink to dry out through the exposed nib when a user neglects to retract or close the nibs. Also, having extended and exposed nibs can be undesirable when operated by a child, such as in a marker, as the child may inadvertently get ink on furniture or walls when a marker is left unattended with an exposed nib. Additionally, children may not know how to close or retract the nibs.

SUMMARY

In accordance with one aspect of the disclosure, there is a need for a writing or drawing instrument that does not require an active action by the user to retract the nib and that can be easily operated by a child (e.g., between 1-5 years old). In accordance with one aspect of the disclosure, a writing instrument (e.g., marker) is provided that can automatically retract upon the user releasing the grip on the writing instrument.

In accordance with another aspect of the disclosure, a writing instrument is provided that has a tip that can retract automatically upon release of a grip on the writing instrument. The writing instrument has one or more leaves that can be flexed to push the cartridge towards the front end of the writing instrument to expose the tip. A spring applies a force on the cartridge to automatically retract the tip when a grip on the writing instrument is released.

In accordance with one aspect of the disclosure, a writing instrument is provided that includes a housing extending along an axis and between a base at a rear end of the writing instrument and a curved front end at a front end of the writing instrument. The housing includes a pair of spaced apart beams that extend between and connect to the base and the curved front end, and a platform that extends between and interconnects the pair of spaced apart beams at a location between the rear end and curved front end. The writing instrument also includes a cartridge extending between the rear end and the front end, a nib configured to extend from the front end of the cartridge. The cartridge is configured to be disposed inside the housing so the front end of the cartridge is extendable through an opening of the curved front end of the housing, and so an outer tubular surface of the cartridge extends through an opening in the platform. The cartridge further includes a pair of arms that extend from opposite sides of the cartridge and generally perpendicular to a central axis of the cartridge. The writing instrument also includes a pair of leaves coupled to the rear end of the housing and extending to the front end proximate the curved front end of the housing so that the pair of leaves extend along a majority of a length of the writing instrument. Each of the leaves extends between the pair of spaced apart beams and includes a pair of spaced apart pawls with an angled edge that tapers toward the front end. The pair of spaced apart pawls is configured to slidingly engage the pair of arms, a portion of each leaf configured to flex toward the axis of the housing relative to the rear end of the leaf. The writing instrument also includes an overgrip sleeve extending over the pair of spaced apart beams and pair of leaves from the base of the housing to the curved front end of the housing. Flexing the pair of leaves toward the axis of the housing causes the pawls of the pair of leaves to engage the pair of arms to move the cartridge in a first direction relative to the curved front end so that the nib protrudes from the curved front end. Releasing the pair of leaves (e.g., releasing a grip on the writing instrument) causes the cartridge to move in a second direction opposite the first direction to retract the nib so that it does not protrude from the curved front end.

In accordance with another aspect of the disclosure, a writing instrument is provided that includes a housing extending along an axis and between a base at a rear end of the writing instrument and a curved front end at a front end of the writing instrument. The housing includes a pair of spaced apart beams that extend between and connect to the base and the curved front end, and a platform that extends between and interconnects the pair of spaced apart beams at a location between the rear end and curved front end. The writing instrument also includes a cartridge extending between the rear end and the front end, a nib configured to extend from the front end of the cartridge. The cartridge is configured to be disposed inside the housing so the front end of the cartridge is extendable through an opening of the curved front end of the housing, and so an outer tubular surface of the cartridge extends through an opening in the platform. The cartridge further includes one or more arms that extend from opposite sides of the cartridge and generally perpendicular to a central axis of the cartridge. The writing instrument also includes a leaf coupled to the rear end of the housing and extending to a front end proximate the curved front end of the housing so that the leaf extends along a majority of a length of the writing instrument. The leaf extends between the pair of spaced apart beams and includes one or more pawls with angled edges that tapers toward the front end. The one or more pawls are configured to slidingly engage at least a portion of the one or more arms, a portion of the leaf configured to flex toward the axis of the housing relative to the rear end of the leaf. The writing instrument also includes an overgrip sleeve extending over the pair of spaced apart beams and the leaf from the base of the housing to the curved front end of the housing. Flexing the leaf toward the axis of the housing causes the one or more pawls of the leaf to engage the one or more arms to move the cartridge in a first direction relative to the curved front end so that the nib protrudes from the curved front end. Releasing the leaf (e.g., releasing a grip on the writing instrument) causes the cartridge to move in a second direction opposite the first direction to retract the nib so that it does not protrude from the curved front end.

In accordance with another aspect of the disclosure, a writing instrument kit is provided. The writing instrument kit includes a writing instrument (e.g., marker). The writing instrument comprises a housing extending along an axis and between a base at a rear end of the writing instrument and a curved front end at a front end of the writing instrument. The housing includes a pair of spaced apart beams that extend between and connect to the base and the curved front end, and a platform that extends between and interconnects the pair of spaced apart beams at a location between the rear end and curved front end. The writing instrument also includes a cartridge extending between the rear end and the front end, a nib configured to extend from the front end of the cartridge. The cartridge is configured to be disposed inside the housing so the front end of the cartridge is extendable through an opening of the curved front end of the housing, and so an outer tubular surface of the cartridge extends through an opening in the platform. The cartridge further includes one or more arms that extend from opposite sides of the cartridge and generally perpendicular to a central axis of the cartridge. The writing instrument also includes a leaf coupled to the rear end of the housing and extending to a front end proximate the curved front end of the housing so that the leaf extends along a majority of a length of the writing instrument. The leaf extends between the pair of spaced apart beams and includes one or more pawls with angled edges that tapers toward the front end. The one or more pawls are configured to slidingly engage at least a portion of the one or more arms, a portion of the leaf configured to flex toward the axis of the housing relative to the rear end of the leaf. The writing instrument also includes an overgrip sleeve extending over the pair of spaced apart beams and the leaf from the base of the housing to the curved front end of the housing. Flexing the leaf toward the axis of the housing causes the one or more pawls of the leaf to engage the one or more arms to move the cartridge in a first direction relative to the curved front end so that the nib protrudes from the curved front end. Releasing the leaf (e.g., releasing a grip on the writing instrument) causes the cartridge to move in a second direction opposite the first direction to retract the nib so that it does not protrude from the curved front end. The writing instrument kit also comprises one or more additional overgrip sleeves configured to replace the overgrip sleeve of the writing instrument.

In one implementation, the one or more additional overgrip sleeves have different surface textures or colors or visual indications.

DETAILED DESCRIPTION

Various embodiments disclosed herein relate to a writing instrument that can automatically retract its nib upon release of a grip on the writing instrument by a user (e.g., a child). Advantageously, the writing instrument disclosed herein facilitates use by a child and inhibits (e.g., prevents) inadvertent use of the writing instrument (e.g., to stain walls or furniture) by automatically retracting the nib when the user (e.g., child) releases their grip on the writing instrument. An automatically retractable nib also advantageously inhibits (e.g., prevent) drying because the nib is retracted when not in use.

Figure 1A:
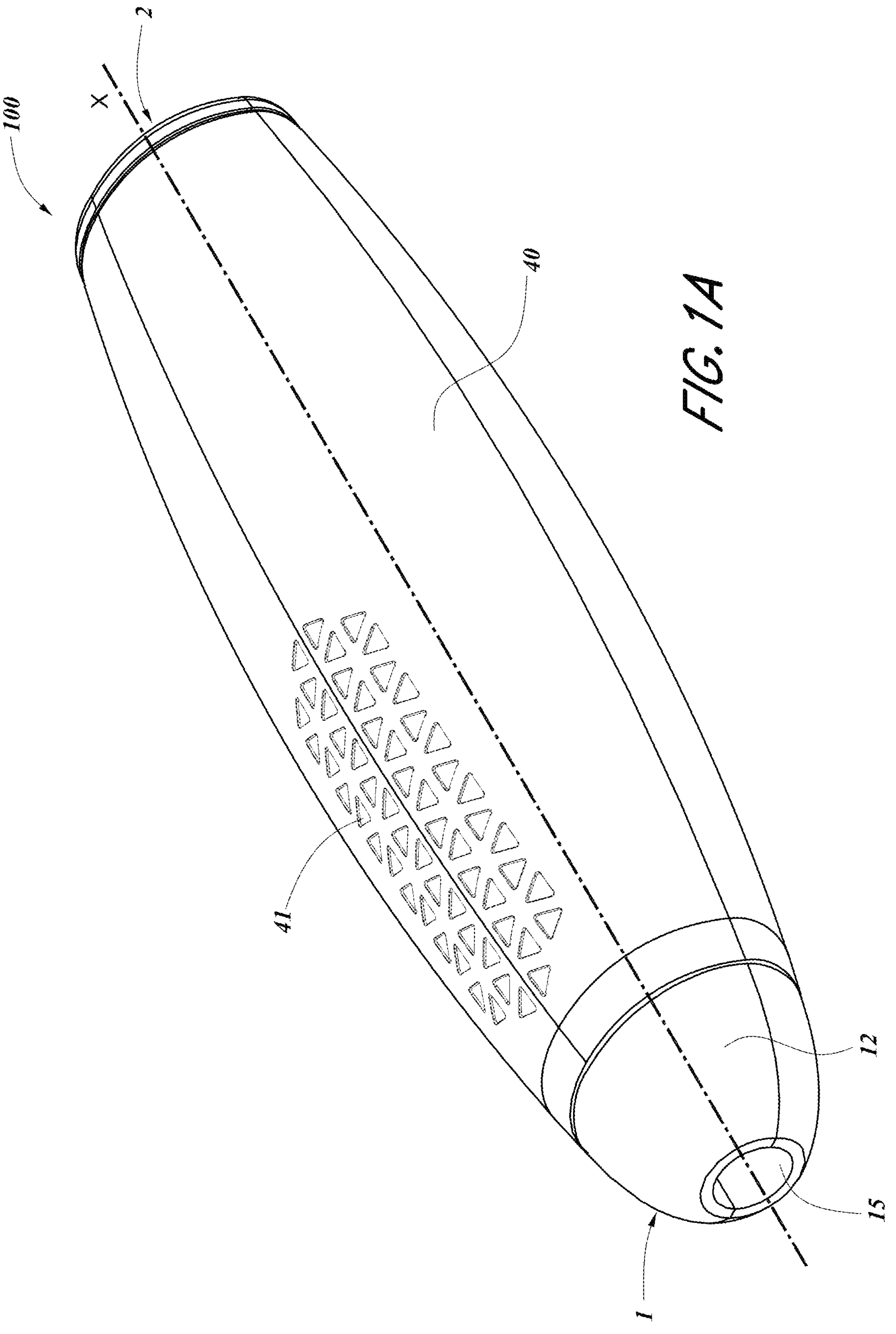
FIG. 1A is a top perspective view of an automatically retractable writing instrument.

An automatically retractable writing instrument (e.g. a marker, a pen, a pencil) can include a mechanism to extend the nib when being gripped or pressed by a user, and that retracts the nib when a grip on the writing instrument is released. FIGS. 1A to 5 illustrate a writing instrument 100 that can extend and retract a tip through cooperation of a pair of flexible leaves and a spring, as further discussed below. FIG. 1A is a top perspective view of the writing instrument 100 showing an overgrip sleeve 40, a front end 1 of the writing instrument 100, and a rear end 2 of the writing instrument 100. The writing instrument 100 can include a housing 10 surrounded by the overgrip sleeve 40, wherein a curved front end 12 of the housing 10 can extend past (e.g., protrude relative to an end of) the overgrip sleeve 40. The overgrip sleeve 40 can have a grip pattern or feature 41 that creates friction to enable (e.g., facilitate) a firmer grip on the writing instrument 100 by the user. The overgrip sleeve 40 can be made of an elastic material that enables a user to easily remove and replace the overgrip sleeve 40 over the housing 10. The overgrip sleeve 40 can have different colors or different visual images (e.g., logos, characters, wording). The writing instrument 100 can extend along and/or about an axis x that extends along a length of the writing instrument, as shown in FIG. 1A.

Figure 1B:
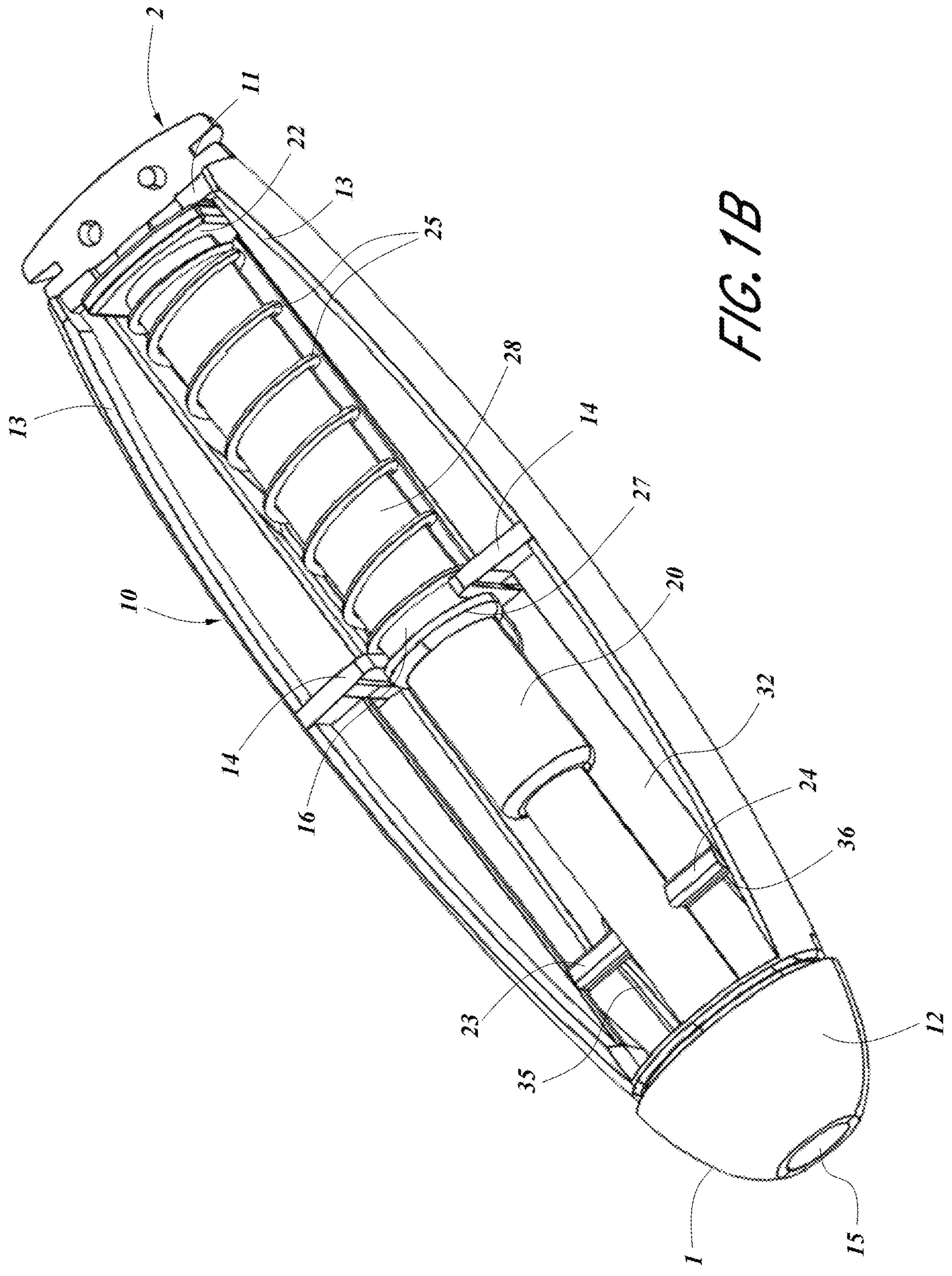
FIG. 1B is a top perspective internal view of the writing instrument in FIG. 1A.

FIG. 1B is an internal view of the writing instrument showing the housing and a cartridge 20. The housing 10 can extend along the axis x and between a base 11 at the rear end 2 and the curved front end 12 at the front end 1. The curved front end 12 of the housing 10 can include an opening 15 from which a tip of the writing instrument can selectively protrude (e.g., when the writing instrument 100 is gripped by a user). The housing 10 can include a pair of spaced apart beams 13 that extend between and connect to the base 11 and the curved front end 12. The writing instrument 10 can further include a platform 14 that can extend between and interconnect the pair of spaced apart beams 13 at a location between the base 11 and the curved front end 12.

As shown in FIG. 1B, the cartridge 20 can extend between the rear end 2 and the front end 1. The cartridge 20 can have a cap 22 at the rear end 2. An outer tubular surface 28 of the cartridge 20 can extend through an opening 16 in the platform 14 of the housing 10. A spring 25 can be disposed between the platform 14 and the cap 2. The cartridge can include a pair of arms 23, 24 via which a force can be exerted on the cartridge 20 to translate the cartridge 20 in a first direction towards the front end 1 (e.g., to extend the writing instrument tip out of the opening 15). Optionally, the pair of arms 23, 24 can have angled surfaces (best seen in FIGS. 2C and 5). In one implementation, the pair of arms 23, 24 can have a cross-section perpendicular to the length of the arms 23, 24 that is generally trapezoidal. The cartridge 20 can further include a ridge 27 on the outer tubular surface 28. The ridge 27 can engage the platform 14 to stop movement of the cartridge 20 in a second direction towards the rear end 2 (e.g., when a grip on the writing instrument 100 is released so that the tip automatically retracts).

Figure 2A:
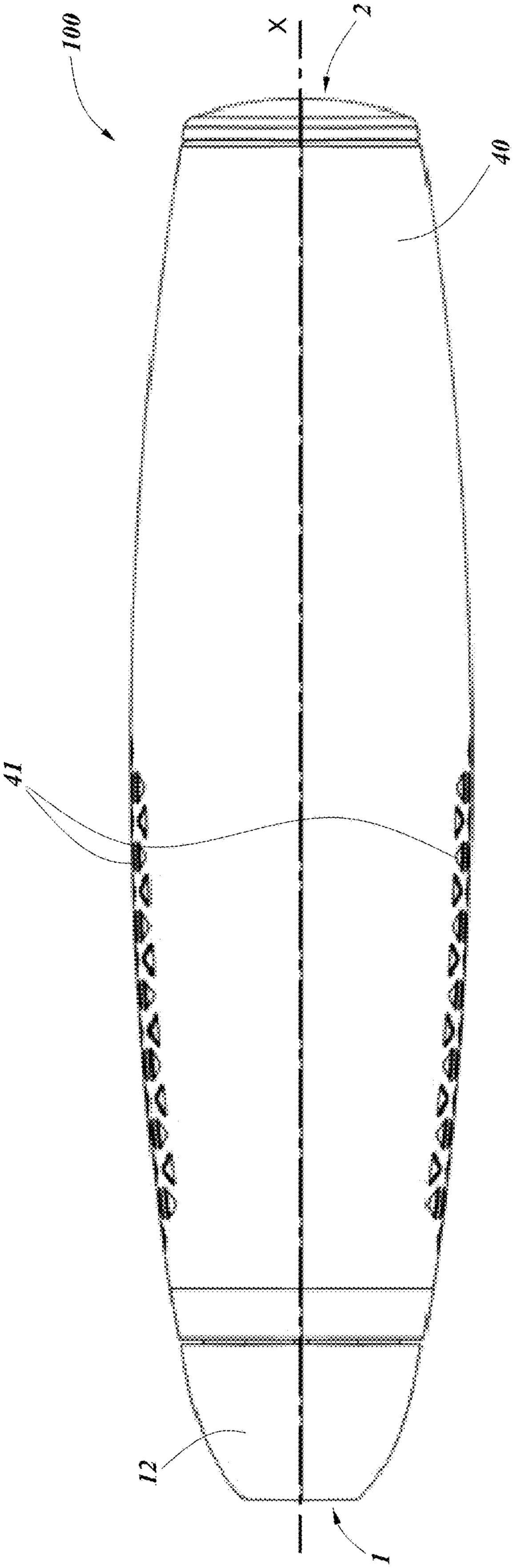
FIG. 2A is a side view of the writing instrument in FIG. 1A.
Figure 2B:
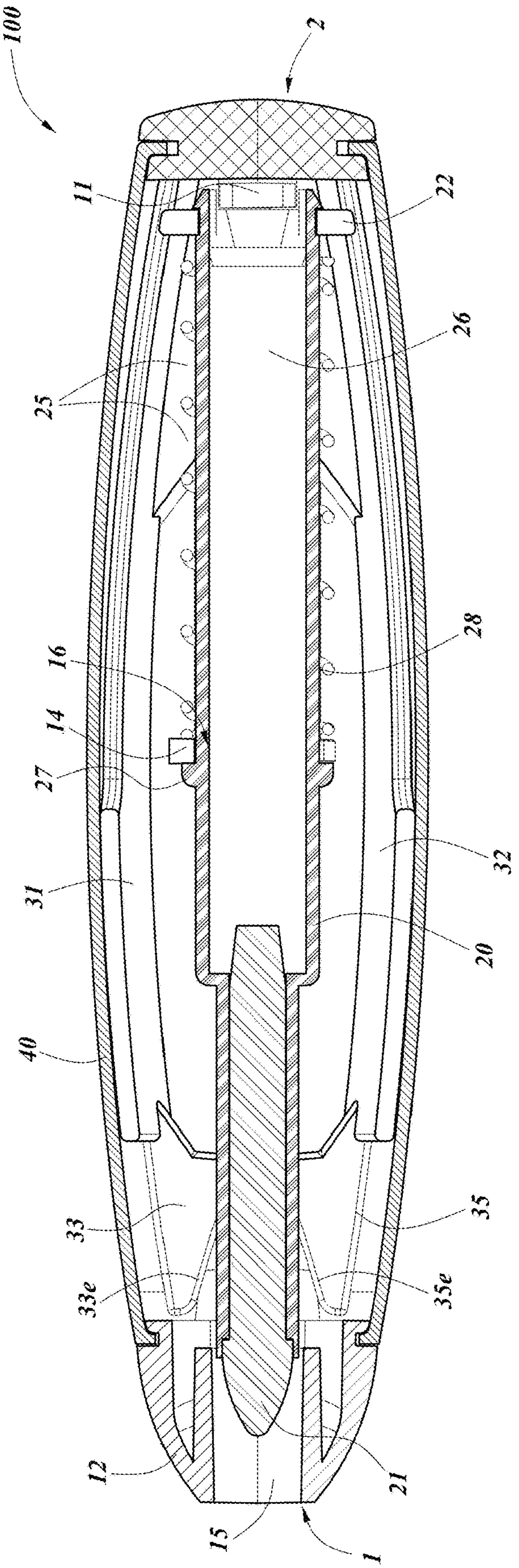
FIG. 2B is a cross-sectional view of the writing instrument in FIG. 2A, along the plane of the page in FIG. 2A.
Figure 2C:
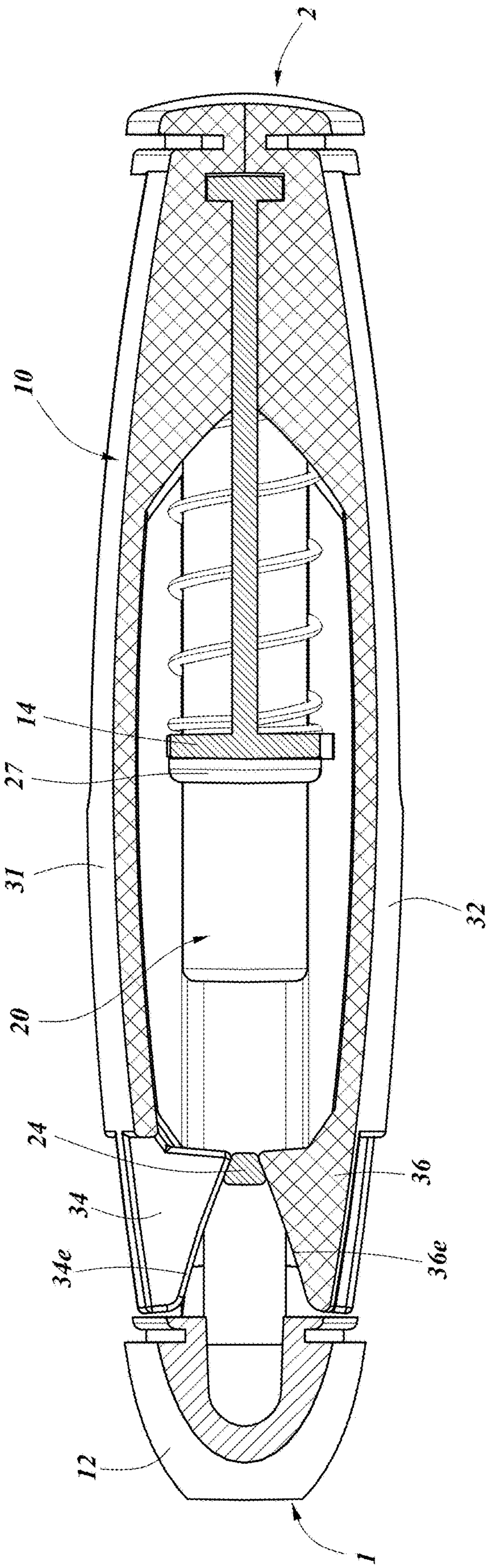
FIG. 2C is another cross-sectional view of the writing instrument in FIG. 2A, along a plane parallel to the page in FIG. 2A.
Figure 2D:
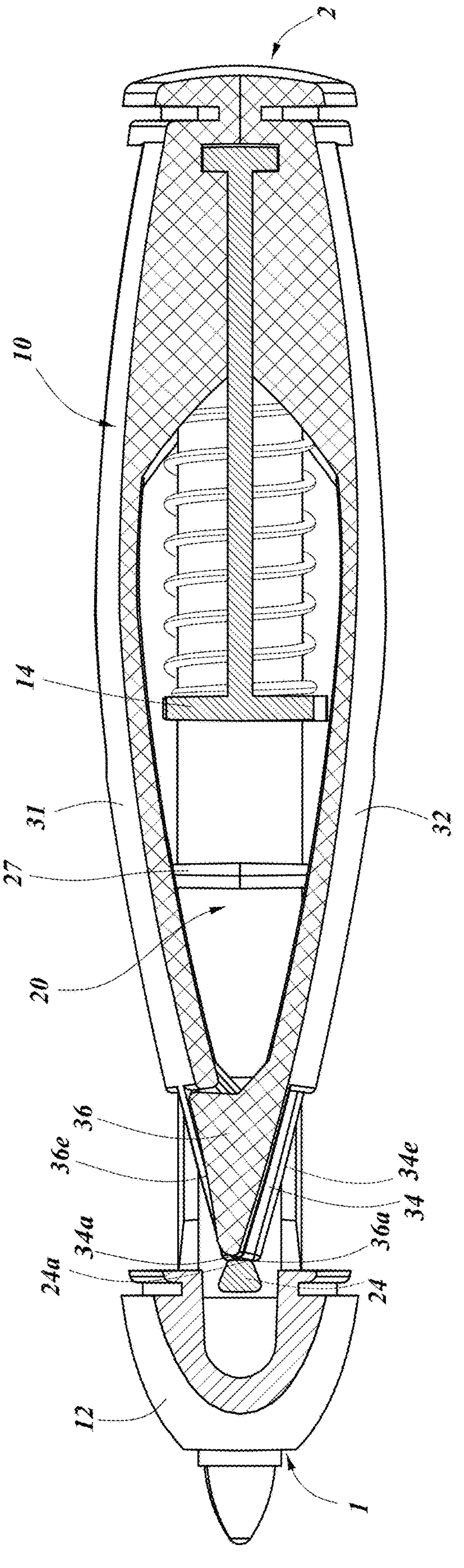
FIG. 2D is another cross-sectional view of the writing instrument in FIG. 2A, along a plane parallel to the page in FIG. 2A, with the leaves flexed toward the axis of the writing instrument.
Figure 3A:
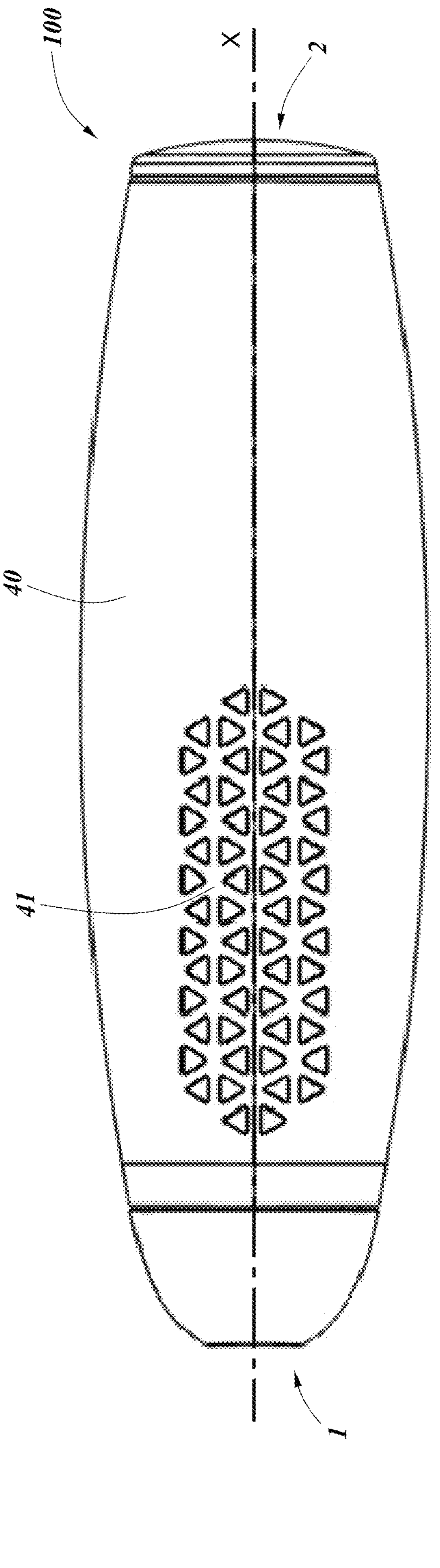
FIG. 3A is a top view of the writing instrument in FIG. 1A.
Figure 3B:
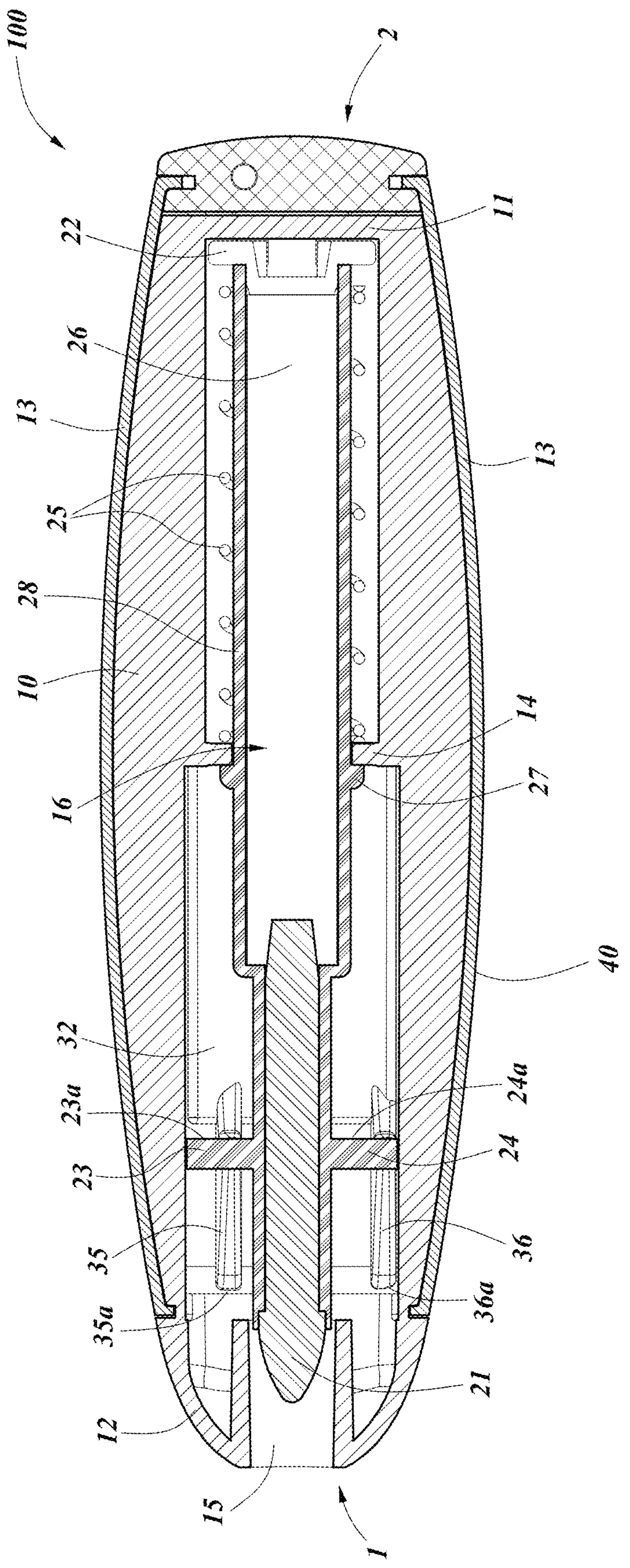
FIG. 3B is a cross-sectional view of the writing instrument in FIG. 3A, along the plane of the page in FIG. 3A.

FIG. 2A-2D show the writing instrument 100 from a side, and FIG. 3A-3B show the writing instrument 100 from a top view. As shown in FIG. 2B (see also FIG. 4A and a pair of leaves, a top leaf 31 and a bottom leaf 32, can be attached to the housing 10. The pair of leaves 31 and 32 can be coupled to the base 11 and extend toward the front end 1 to a location proximate the curved front end 12 so that the pair of leaves 31 and 32 extend along a majority of the length of the writing instrument. A front or distal portion of each leaf 31, 32 can flex toward the axis x relative to the portion of the leaf 31, 32 that is coupled to the base 11. In one implementation, the connection of the leaves 31, 32 to the base 11 can define a hinge (e.g., a living hinge or portion, such as of reduced thickness, about which the leaves 31, 32 flex). Each of the top leaf 31 and the bottom leaf 32 can have one or more pawls that can slidingly engage the pair of arms 23 and 24 to push the cartridge 20 in the first direction toward the front end 1 (e.g., when the writing instrument 100 is gripped by the user to extend the tip). For example, the top leaf 31 can include pawls 33 and 34, and the bottom leaf 32 can include pawls 35 and 36. The pawls 33 and 35 are shown in FIG. 2B and can engage the arm 23. Each of the pawls 33 and 35 can have an angled edge, 33*e* and 35*e* respectively, that tapers towards the front end 1 and engages a surface of the arm 23. FIG. 2C is another cross-sectional view that shows the interaction between the pawls 34 and 36 and the arm 24.

When a user grips on the writing instrument 100, as shown in FIG. 2D, the front or distal portions of leaves 31 and 32 can flex toward the axis x until the arms 23 and 24 are moved along and pass the edges 33*e*, 36*e* of pawls 33, 36 on the leaves 31, 32 to automatically reach an engaged or locked position. In the locked position, ends 23*a*, 24*a* of the arms 23, 24 (see FIGS. 3B and 5) engage (e.g., contact) the ends 33*a*, 36*a* of the pawls 33, 36 such that the pawls 33,36 can withstand a force applied on the tip 21 when in use (e.g., when the user is writing with the writing instrument 100) without such force being felt by the user while gripping the leaves 31, 32. This locking mechanism can enable a user to easily write or draw with the writing/drawing instrument 100 without having to apply a greater force than that required to flex the leaves of the writing instrument 100. Once the use releases grip of the leaves 31, 32 so that the leaves 31, 32 move away from the axis x, the locking mechanism automatically releases (e.g., the pawls 33, 36 automatically move outward relative to the axis x so that the ends 23*a*, 24*a* of the arms 23, 24 cease engaging the ends 33*a*, 36*a* of the pawls 33, 36.

The pawl 36 is shown in FIG. 3B in the top cross-sectional view and can slidingly engage arm 24 in cooperation with pawl 34. The pair of arms 23 and 24 can extend from opposite sides of the cartridge 20 and generally perpendicular to the axis x as shown in FIG. 3B. FIGS. 2B and 3B show that a tip 21 can be disposed inside the cartridge 20 and selectively extends out of the cartridge 20 in the front end 1 (e.g., when the writing instrument 100 is gripped to cause the leaves 31, 32 to apply a force on the arms 23, 24 to advance the cartridge 20 toward the front end 1, via engagement of the pawls with the arms 23, 24). A reservoir 26 can be disposed inside the cartridge 20 toward the rear end 2 and connected to the tip 21, providing ink to the tip 21.

Figures 4A, 4B:
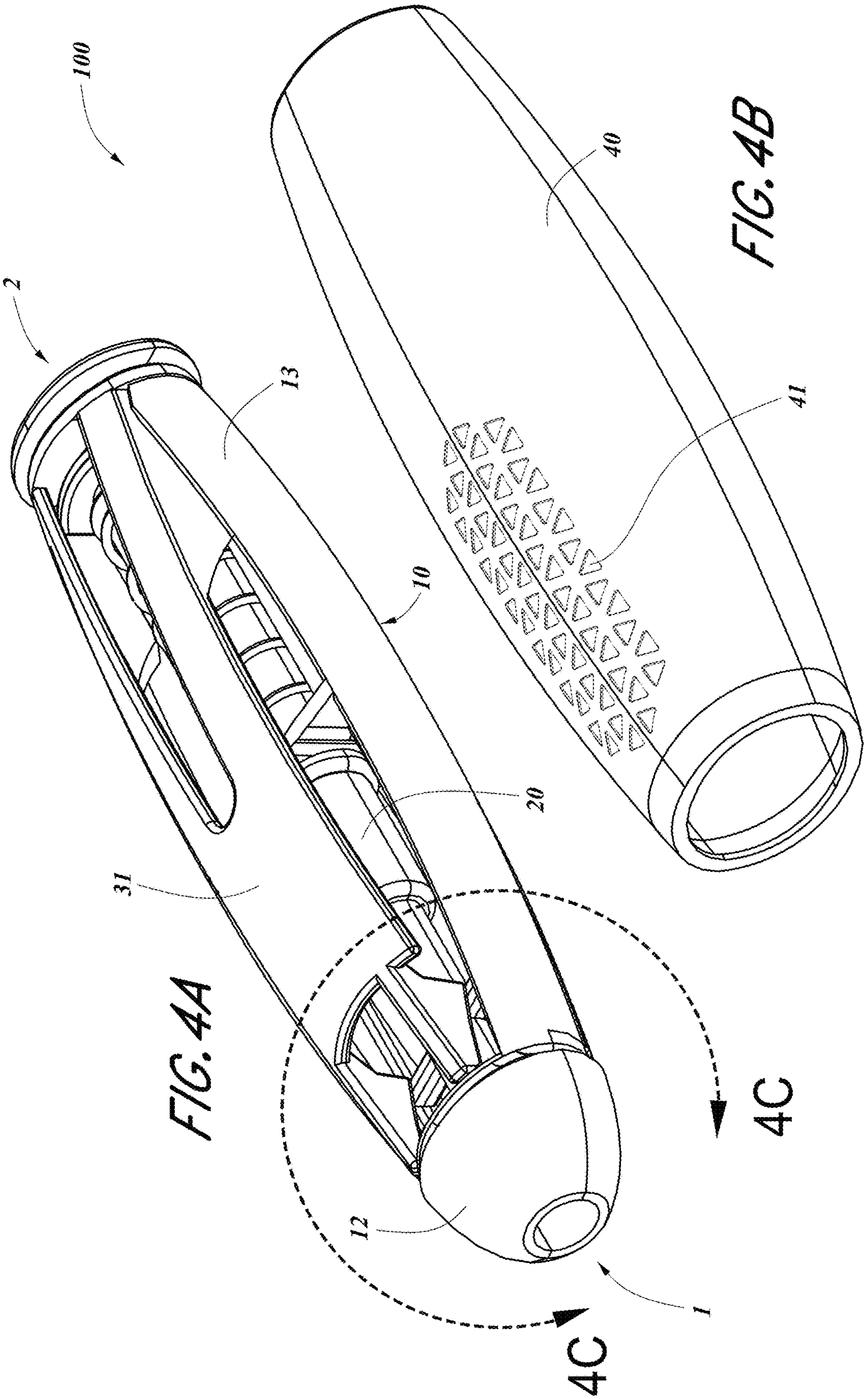
FIG. 4A is a top perspective view of the writing instrument in FIG. 1A without an overgrip sleeve.
FIG. 4B is a top perspective view of the overgrip sleeve of the writing instrument in FIG. 1A.
Figure 4C:
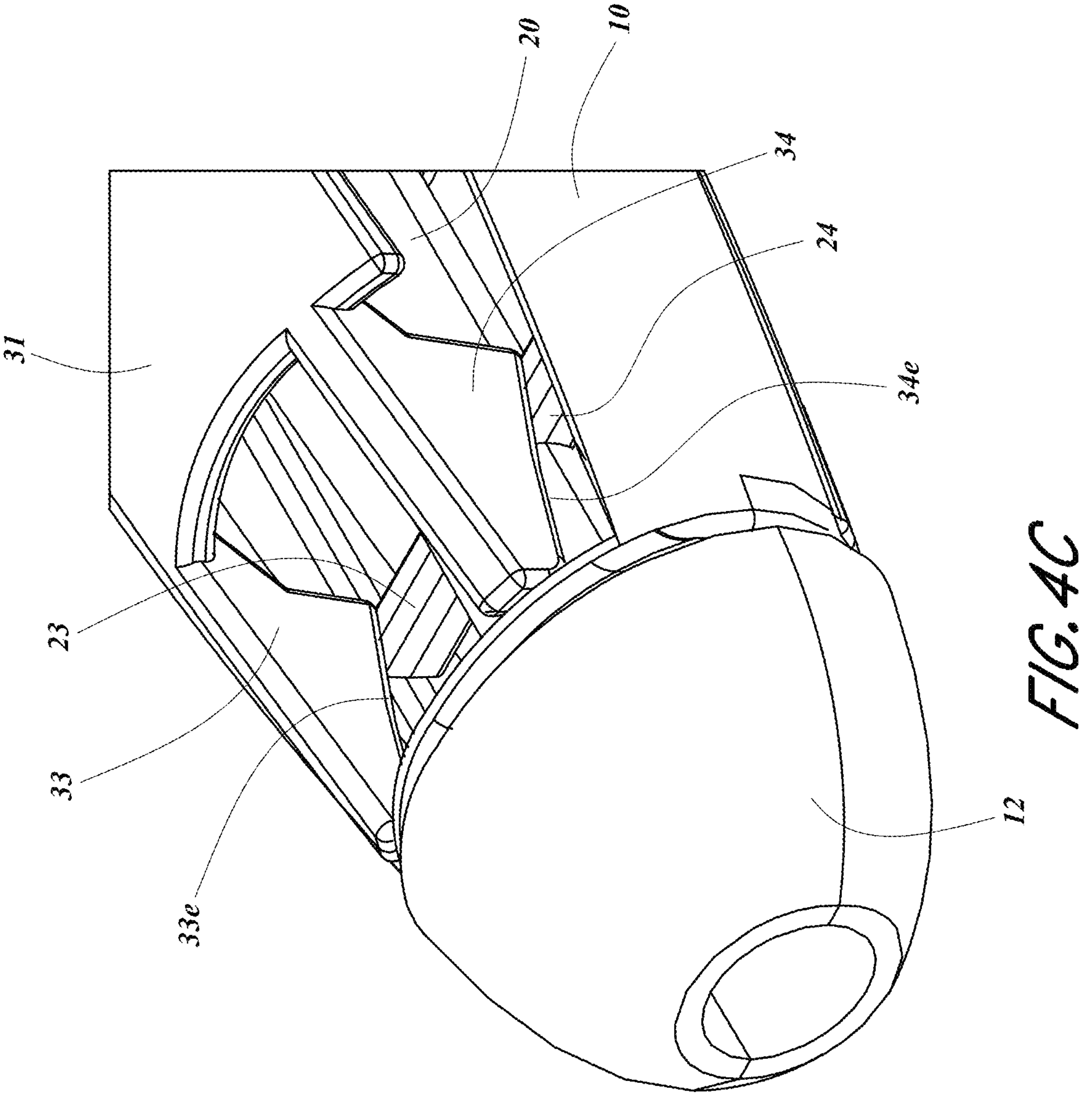
FIG. 4C is a magnified top perspective view of an end portion of the writing instrument without the overgrip sleeve in FIG. 4A.

FIG. 4A-4C show how the tapered pawls 33-36 engage the arms 23-24 in greater details (see also FIG. 2C). FIG. 4A shows writing instrument 100 without the overgrip sleeve 40 in FIG. 4B in a resting (e.g., ungripped) position. As illustrated in the magnified view FIG. 4C of the front end 1 of the writing instrument 100, each of the edges 33*e* and 34*e* of the pawls 33 and 34 contacts one of the arms 23 and 24 at a first end closer to the rear end 2 in the resting position. A user can flex the leaves 31 and 32 by pressing on the grip pattern 41 on the over grip sleeve 40 (e.g., by gripping the writing instrument 100). Flexing the pair of leaves 31 and 32 towards the axis x causes the pawls 33, 36 of the pair of leaves 31 and 32 to engage the pair of arms 23 and 24 and slide along corresponding contact surfaces of the pair of arms 23, 24 to move the cartridge 20 in the first direction towards the front end 1 so that the tip 21 can protrude from the curved front end 11 (e.g., protrude out of the opening 15). That is, when the leaves 31 and 32 are flexed, the pawls 33, 35 can move towards the axis x, pushing the arms 23 and 24 to move along the angled edges 33*e*, 36*e* towards the front end 1. In the flexed position, the edges 33*e* and 34*e* can contact the arms 23 and 24, respectively, at second ends closer to the front end 1 of the edges 33*e* and 34*e* in FIG. 4C. The tip 21 can be fully exposed when the arms 23 and 24 are moved along the edges 33*e*, 36*e* so that the ends 23*a*, 24*a* engage the ends 33*a*, 36*a* of the pawls 33, 36 in the locking position as described above. In the locking position, the pawls 33, 36 can support the force applied against the tip 21 when writing on a surface at the engagement of ends 33*a*, 36*e* and ends 23*a*, 24*a*. When the leaves 31 and 32 are flexed and the cartridge 20 are moved toward the front end 1, the spring 25 can be compressed between the cap 22 of the cartridge 20 and the platform 14 of the housing 10, generating a spring force. When the user releases the grip on the writing instrument 100, the spring 25 applies a force, due to it having been compressed, that moves the cartridge 20 in the second direction toward the rear end 2 by pressing on the cap 22. Therefore, when the grip on the writing instrument 100 is released, the leaves 31 and 32 will automatically return to their resting position (e.g., relative to the arms 23, 24 and the housing 10). In the resting position, no force is applied (e.g., by a user) to overcome a tension force generated by the compressed spring 25 on the cartridge 20, allowing the cartridge 20 to be moved towards or retained proximate the rear end 2 by the tension force applied by the spring 25, causing the tip 21 to be automatically retracted into the curved front end 12 and/or to maintain the tip 21 in the retracted position.

Figure 5:
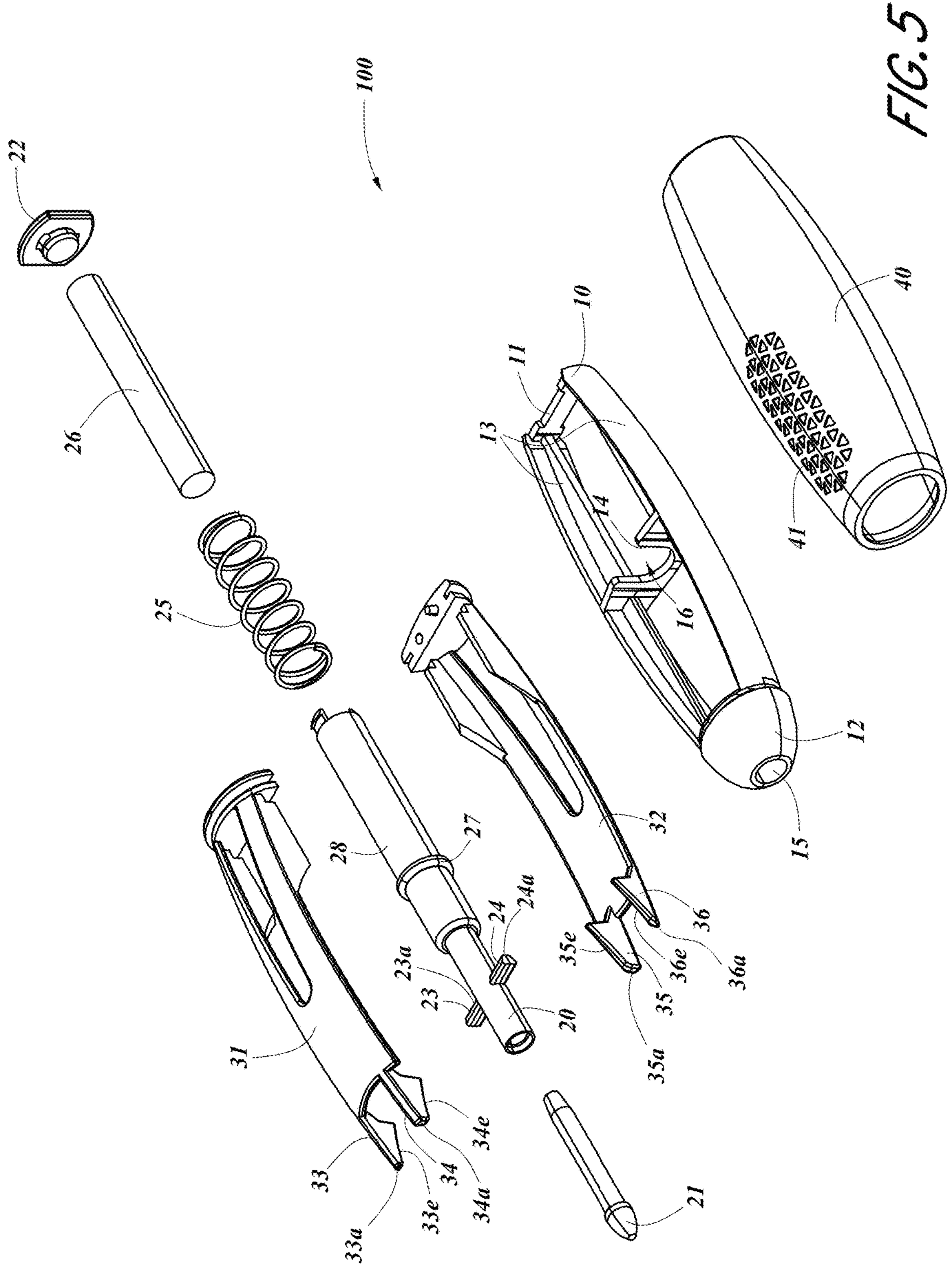
FIG. 5 is an exploded view of the writing instrument in FIG. 1A.

FIG. 5 shows each component of the writing instrument 100 in an exploded view. In some embodiments, the pawls 33 and 34 of leaf 31 can be offset relative to the pawls 35 and 36 of the other leaf 32 when connected to the housing 10 such that the pawls 33 and 34 engage the arm 23 at different distances from the axis x and the pawls 35 and 36 engage the arm 24 at different distances from the axis x. In this manner, the pawls 33, 36 on each side do not interfere with each other when they contact the arms 23, 24. Though the illustrated implementation shows the writing instrument 100 with two leaves 31, 32, in another implementation the writing instrument can have one leaf that can be flexed to have its pawls engage the arms of the cartridge to extend the tip, and which can be released to automatically retract the tip (e.g., under a force exerted by the spring).

Figure 6:
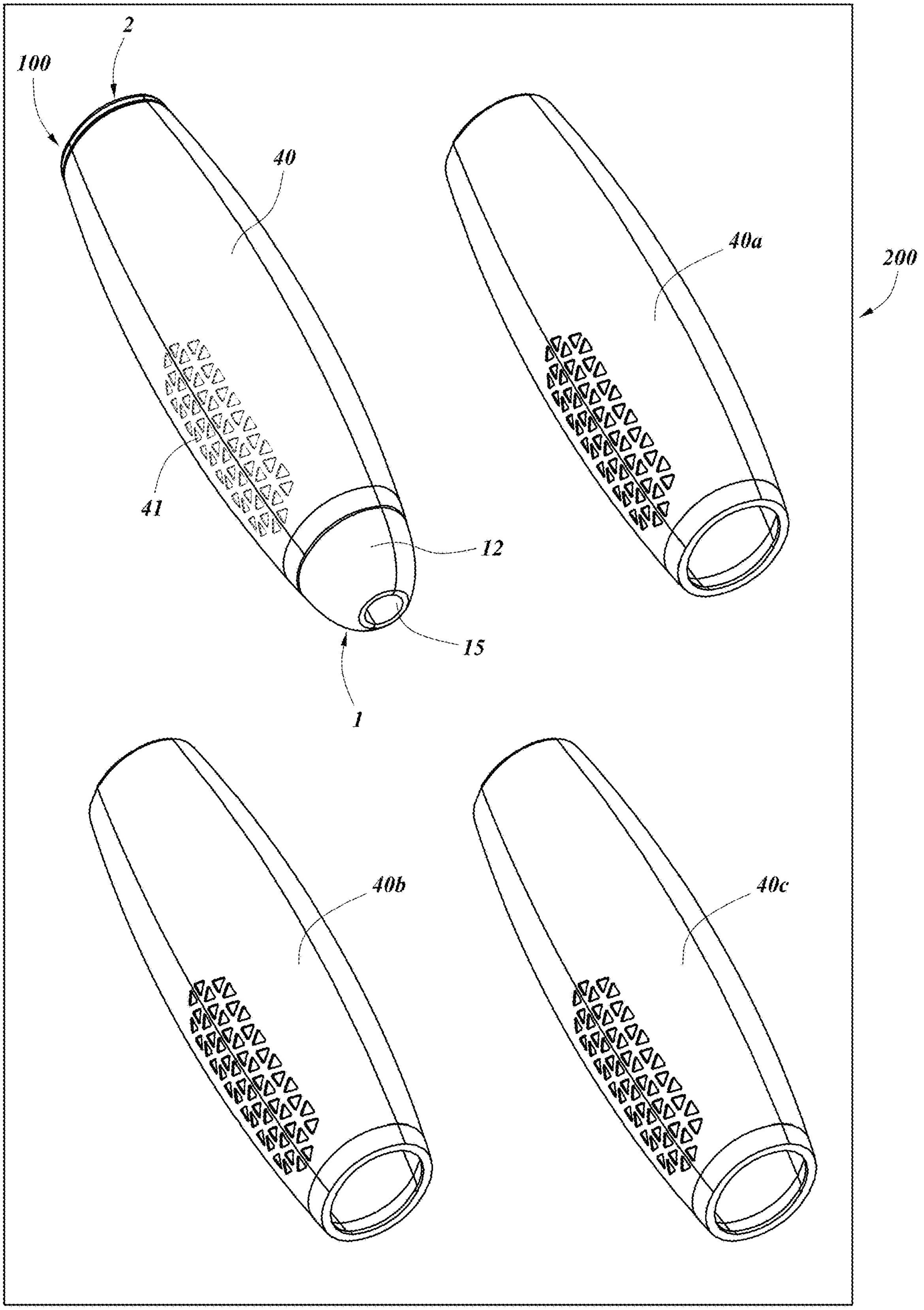
FIG. 6 is a schematic view of a kit including a writing instrument and multiple overgrip sleeves.

Finally, another aspect of the disclosure involves a writing instrument kit that can include a writing or drawing instrument described above and one or more interchangeable overgrip sleeves. The kit advantageously allows a user to replace the overgrip sleeve 40 on the writing instrument 100 to customize the writing instrument 100 (e.g., with an overgrip sleeve 40 having a different color and/or grip texture and/or visual indication, such as images, logos and wording). Additionally, the kit allows the user to replace the overgrip sleeve over the housing 10, for example when the overgrip sleeve 40 has become worn, thereby extending the life of the writing instrument 100. The one or more overgrip sleeves can have customizable designs (e.g. different textures, colors, or visual indications). As shown in FIG. 6, a writing instrument kit 200 can include a writing instrument 100 and multiple overgrip sleeves 40*a*-40*c*. The kit 200 can allow a user to use a writing instrument 100 with multiple overgrip sleeves 40*a*-40*c* having different designs (not shown) and switch between them easily by taking off an over grip sleeve 40 and replacing it with one of the overgrip sleeves 40*a*, 40*b*, or 40*c* over the housing 10 of the writing instrument 100. In other embodiments, a kit of overgrip sleeves (e.g., without the writing instrument) can be provided for customization or replacement of an overgrip sleeve of a writing instrument.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the embodiments above are described in connection with markers, one of ordinary skill in the art will recognize that the above described features and functions can also be incorporated into any writing or drawing instruments (e.g. pencils, pens, painting brushes, crayons, and etc.) or any other devices that may be desirable to have retractable tips (precision knives, keys, and etc.).

What is claimed is:

1. A writing instrument, comprising:

a housing extending along an axis and between a base at a rear end of the writing instrument and a curved front end at a front end of the writing instrument, the housing comprising a pair of spaced apart beams that extend between and connect to the base and the curved front end, a platform extending between and interconnecting the pair of spaced apart beams at a location between the rear end and curved front end;

a cartridge extending between the rear end and the front end, a nib configured to extend from the front end of the cartridge, the cartridge configured to be disposed inside the housing, so the front end of the cartridge is extendable through an opening of the curved front end of the housing, and so an outer tubular surface of the cartridge extends through an opening in the platform, the cartridge further comprising a pair of arms that extend from opposite sides of the cartridge and generally perpendicular to a central axis of the cartridge;

a pair of leaves coupled to the rear end of the housing and extending to the front end proximate the curved front end of the housing so that the pair of leaves extend along a majority of a length of the writing instrument, each of the leaves extending between the pair of spaced apart beams and comprising a pair of spaced apart pawls with an angled edge that tapers toward the front end, the pair of spaced apart pawls configured to slidingly engage the pair of arms, a portion of each leaf configured to flex toward the axis relative to the rear end of the leaf; and an overgrip sleeve extending over the pair of spaced apart beams and pair of leaves from the base of the housing to the curved front end of the housing, wherein flexing the pair of leaves toward the axis of the housing causes the pawls of the pair of leaves to engage the pair of arms to move the cartridge in a first direction relative to the curved front end so that the nib protrudes from the curved front end, and wherein releasing the pair of leaves causes the cartridge to move in a second direction opposite the first direction to retract the nib so that it does not protrude from the curved front end.

2. The writing instrument of claim 1, furthering comprising a spring positioned between the platform and the base of the housing, the spring configured to be compressed when the cartridge moves in the first direction to generate a spring force, said spring force configured to cause movement of the cartridge in the second direction when the pair or leaves are released.

3. The writing instrument of claim 1, further comprising a ridge on the outer tubular surface of the cartridge that engages the platform to stop movement of the cartridge in the second direction.

4. The writing instrument of claim 1, wherein the overgrip sleeve comprises flexible material.

5. The writing instrument of claim 1, wherein the pair of arms comprise angled surfaces that engage angled edges of the pawls.

6. The writing instrument of claim 1, wherein the housing is a single piece.

7. The writing instrument of claim 1, wherein the pawls of one leaf are offset relative to the pawls of the other leaf when connected to the housing.

8. The writing instrument of claim 1, wherein rear ends of the pair of leaves couple to each other adjacent the base of the housing.

9. The writing instrument of claim 1, wherein the writing instrument is a marker.

10. The writing instrument of claim 1, wherein the pair of leaves automatically lock the nib in an extended position to allow a user to write with the writing instrument without the nib retracting back into the housing during said writing, and wherein releasing the pair of leaves automatically unlocks the nib from the extended position and allows the nib to retract into the housing.

11. A writing instrument, comprising:

a housing extending along an axis and between a base at a rear end of the writing instrument and a curved front end at a front end of the writing instrument, the housing comprising a pair of spaced apart beams that extend between and connect to the base and the curved front end, a platform extending between and interconnecting the pair of spaced apart beams at a location between the rear end and curved front end;

a cartridge extending between the rear end and the front end, a nib configured to extend from the front end of the cartridge, the cartridge configured to be disposed inside the housing, so the front end of the cartridge is extendable through an opening of the curved front end of the housing, and so an outer tubular surface of the cartridge extends through an opening in the platform, the cartridge further comprising one or more arms that extend from opposite sides of the cartridge and generally perpendicular to a central axis of the cartridge;

a leaf coupled to the rear end of the housing and extending to a front end proximate the curved front end of the housing so that the leaf extends along a majority of a length of the writing instrument, the leaf extending between the pair of spaced apart beams and comprising one or more pawls with angled edges that tapers toward the front end, the one or more pawls configured to slidingly engage at least a portion of the one or more arms, a portion of the leaf configured to flex toward the axis relative to the rear end of the leaf; and an overgrip sleeve extending over the pair of spaced apart beams and the leaf from the base of the housing to the curved front end of the housing, wherein flexing the leaf toward the axis of the housing causes the one or more pawls of the leaf to engage the one or more arms to move the cartridge in a first direction relative to the curved front end so that the nib protrudes from the curved front end, and wherein releasing the leaf causes the cartridge to move in a second direction opposite the first direction to retract the nib so that it does not protrude from the curved front end.

12. The writing instrument of claim 11, furthering comprising a spring positioned between the platform and the base of the housing, the spring configured to be compressed when the cartridge moves in the first direction to generate a spring force, said spring force configured to cause movement of the cartridge in the second direction when the leaf is released.

13. The writing instrument of claim 11, further comprising a ridge on the outer tubular surface of the cartridge that engages the platform to stop movement of the cartridge in the second direction.

14. The writing instrument of claim 11, wherein the overgrip sleeve comprises flexible material.

15. The writing instrument of claim 11, wherein the one or more arms comprise angled surfaces that engage angled edges of the pawls.

16. The writing instrument of claim 11, wherein the housing is a single piece.

17. The writing instrument of claim 11, wherein the leaf is a pair of leaves coupled to each other adjacent the base of the housing.

18. The writing instrument of claim 11, wherein the pawls of one leaf are offset relative to the pawls of the other leaf when connected to the housing.

19. The writing instrument of claim 11, wherein the leaf automatically locks the nib in an extended position to allow a user to write with the writing instrument without the nib retracting back into the housing during said writing, and wherein releasing the leaf automatically unlocks the nib from the extended position and allows the nib to retract into the housing.

20. A writing instrument kit, comprising:

a writing instrument comprising a housing extending along an axis and between a base at a rear end of the writing instrument and a curved front end at a front end of the writing instrument, the housing comprising a pair of spaced apart beams that extend between and connect to the base and the curved front end, a platform extending between and interconnecting the pair of spaced apart beams at a location between the rear end and curved front end;

a cartridge extending between the rear end and the front end, a nib configured to extend from the front end of the cartridge, the cartridge configured to be disposed inside the housing, so the front end of the cartridge is extendable through an opening of the curved front end of the housing, and so an outer tubular surface of the cartridge extends through an opening in the platform, the cartridge further comprising one or more arms that extend from opposite sides of the cartridge and generally perpendicular to a central axis of the cartridge;

a leaf coupled to the rear end of the housing and extending to a front end proximate the curved front end of the housing so that the leaf extends along a majority of a length of the writing instrument, the leaf extending between the pair of spaced apart beams and comprising one or more pawls with angled edges that tapers toward the front end, the one or more pawls configured to slidingly engage at least a portion of the one or more arms, a portion of the leaf configured to flex toward the axis relative to the rear end of the leaf; and an overgrip sleeve extending over the pair of spaced apart beams and the leaf from the base of the housing to the curved front end of the housing, wherein flexing the leaf toward the axis of the housing causes the one or more pawls of the leaf to engage the one or more arms to move the cartridge in a first direction relative to the curved front end so that the nib protrudes from the curved front end, and wherein releasing the leaf causes the cartridge to move in a second direction opposite the first direction to retract the nib so that it does not protrude from the curved front end; and one or more additional overgrip sleeves configured to replace the overgrip sleeve of the writing instrument.

21. The writing instrument kit of claim 20, wherein the one or more additional overgrip sleeves have different surface textures or colors or visual indications.

* * * * *